United States Patent
Gross et al.

(10) Patent No.: US 7,869,905 B2
(45) Date of Patent: Jan. 11, 2011

(54) METHOD AND APPARATUS FOR USING A HEATER TO CONTROL THE TEMPERATURE OF A POWER SUPPLY IN A COMPUTER SYSTEM

(75) Inventors: Kenny C. Gross, San Diego, CA (US); Aleksey M. Urmanov, San Diego, CA (US); David K. McElfresh, San Diego, CA (US)

(73) Assignee: Oracle America, Inc., Redwood Shores, CA (US)

( * ) Notice: Subject to any disclaimer, the term of this patent is extended or adjusted under 35 U.S.C. 154(b) by 219 days.

(21) Appl. No.: 12/027,900

(22) Filed: Feb. 7, 2008

(65) Prior Publication Data
US 2009/0204839 A1    Aug. 13, 2009

(51) Int. Cl.
G05D 23/00 (2006.01)
G06F 1/00 (2006.01)
G06F 11/30 (2006.01)
G01K 1/08 (2006.01)
G01K 17/00 (2006.01)
G06F 1/16 (2006.01)
H05K 5/00 (2006.01)
H05K 7/00 (2006.01)

(52) U.S. Cl. .................. 700/300; 713/340; 702/132; 702/136; 361/679.02

(58) Field of Classification Search .......... 700/12, 700/197, 299, 300; 713/300, 340; 702/130, 702/132, 136; 361/103, 679.01, 679.02, 361/679.46, 688, 695, 704
See application file for complete search history.

(56) References Cited

U.S. PATENT DOCUMENTS

| | | | | |
|---|---|---|---|---|
| 4,438,630 A * | 3/1984 | Rowe | ............ | 60/676 |
| 5,121,291 A * | 6/1992 | Cope et al. | ........... | 361/695 |
| 5,568,350 A * | 10/1996 | Brown | ............ | 361/104 |
| 5,592,070 A * | 1/1997 | Mino | ............ | 320/163 |
| 5,625,535 A * | 4/1997 | Hulsebosch et al. | ...... | 361/719 |
| 5,726,874 A * | 3/1998 | Liang | ............ | 363/141 |
| 5,926,367 A * | 7/1999 | Gutierrez et al. | ........ | 361/695 |
| 6,023,402 A * | 2/2000 | Kaminski | ............ | 361/103 |
| 6,246,969 B1 * | 6/2001 | Sinclair et al. | ............ | 702/113 |
| 6,369,706 B1 * | 4/2002 | Anderson et al. | ........ | 340/521 |
| 6,677,562 B2 * | 1/2004 | Oshima et al. | ............ | 219/710 |
| 6,721,893 B1 * | 4/2004 | Tressler et al. | ............ | 713/300 |
| 7,043,341 B2 * | 5/2006 | Gallupe et al. | ............ | 700/300 |
| 7,173,821 B2 * | 2/2007 | Coglitore | ............ | 361/695 |
| 7,388,304 B2 * | 6/2008 | Bitoh | ............ | 307/64 |
| 7,458,781 B2 * | 12/2008 | Lee | ............ | 417/18 |
| 2007/0141417 A1 * | 6/2007 | Bitoh | ............ | 429/23 |
| 2007/0219644 A1 * | 9/2007 | Sonobe | ............ | 700/12 |
| 2008/0294295 A1 * | 11/2008 | Chiu | ............ | 700/299 |

FOREIGN PATENT DOCUMENTS

JP        11272341 A  * 10/1999

* cited by examiner

*Primary Examiner*—Crystal J Barnes-Bullock
(74) *Attorney, Agent, or Firm*—Park, Vaughan, Fleming & Dowler LLP

(57) ABSTRACT

A system that controls the temperature of a power supply in a computer system is presented. A state of the computer system is monitored. Next a signal is generated in response to the state of the computer system. The signal is then used to control the temperature of the power supply. Controlling the temperature of the power supply can involve heating the power supply.

22 Claims, 4 Drawing Sheets

METHOD AND APPARATUS FOR USING A HEATER TO CONTROL THE TEMPERATURE OF A POWER SUPPLY IN A COMPUTER SYSTEM

BACKGROUND

1. Field

The present invention relates to techniques for enhancing the performance of computer systems. More specifically the present invention relates to a method and apparatus for controlling the temperature of a power supply in a computer system.

2. Related Art

Power supplies used in computer systems are typically specified to be able to withstand a limited number of power cycles over their lifetime. This power cycle specification is, in part, due to thermal effects on the power supply as it heats up and cools down when the computer system is power cycled. Power supplies that are specified to undergo a larger number of temperature cycles during their lifetime are typically more expensive. Therefore, the number of power cycles a computer system is designed to undergo during its lifetime can impact the cost of the power supply and hence the cost of the computer system.

Computer system users, including businesses that run servers or data centers, may turn off or reduce the electrical power to parts of their computer system for a variety of reasons including time-varying load on the computer system, electrical supply constraints or cost, maintenance, or other business costs or practical concerns. For these reasons computer system users may power cycle their computer system and therefore temperature cycle its power supply more than the power supply was specified to be able to withstand during the lifetime of the computer system.

Hence, what is needed is a method and apparatus for controlling the temperature of a power supply in a computer system without the above-described problems.

SUMMARY

Some embodiments of the present invention provide a system that controls the temperature of a power supply in a computer system. A state of the computer system is monitored. Next a signal is generated in response to the state of the computer system. The signal is then used to control the temperature of the power supply.

In some embodiments, using the signal to control the temperature involves using the signal to control a heater.

In some embodiments, using the signal to control the heater involves using the signal to control the temperature within a temperature range.

In some embodiments, using the signal to control the heater involves using the signal to control the temperature within a temperature range when the signal indicates a change in a load on the computer system.

In some embodiments, using the signal to control the heater involves controlling a rate of change of the temperature.

In some embodiments, using the signal to control the temperature of the power supply involves turning on the heater when the signal indicates the power supply is turned off and turning off the heater when the signal indicates the power supply is turned on.

In some embodiments, using the signal to control the temperature of the power supply involves using the heater to ramp down the temperature at a controlled rate when the signal indicates the power supply is to be turned off.

In some embodiments, using the signal to control the temperature of the power supply involves using the heater to ramp up the temperature of the power supply at a controlled rate when the signal indicates the power supply is to be turned on.

In some embodiments, monitoring the computer system involves systematically monitoring and recording a set performance parameters of the computer system, wherein the recording process keeps track of the temporal relationships between events in different performance parameters.

In some embodiments, using the signal to control the temperature involves using the signal to control a cooling mechanism for the power supply.

In some embodiments, wherein monitoring the state of the computer system involves monitoring the temperature of the computer system.

In some embodiments, monitoring the computer system involves systematically monitoring and recording a set performance parameters of the computer system, wherein the recording process keeps track of the temporal relationships between events in different performance parameters. In some of these embodiments, using the signal to control the temperature involves using the signal to control a heater. In some of these embodiments, using the signal to control the heater involves using the signal to control the temperature within a temperature range.

DETAILED DESCRIPTION

The following description is presented to enable any person skilled in the art to make and use the disclosed embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present description. Thus, the present description is not intended to be limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. This includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media.

Figure 1:
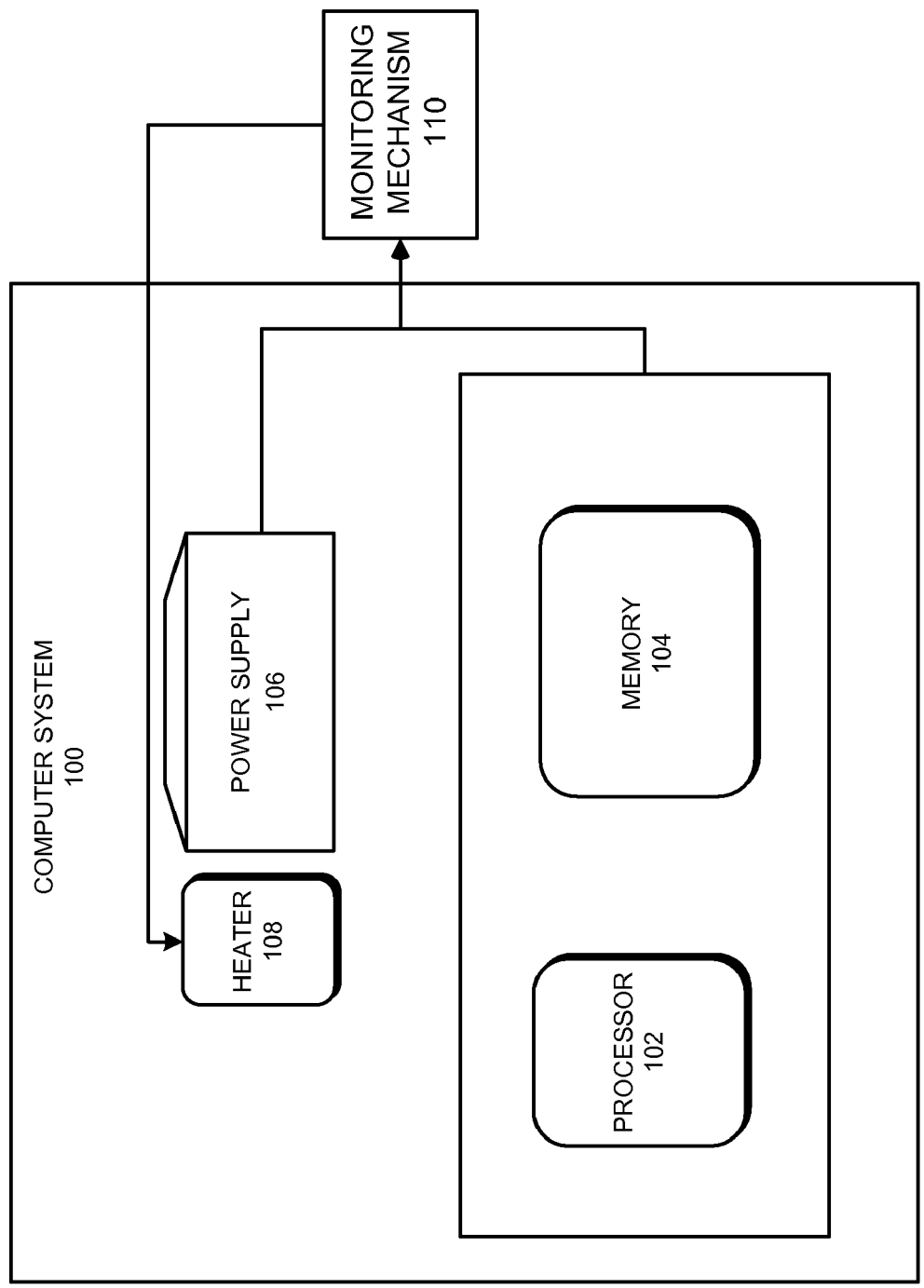
FIG. 1 represents a system that controls the temperature of a power supply in a computer system in accordance with an embodiment of the present invention.

FIG. 1 represents a system that controls the temperature of a power supply in a computer system in accordance with an embodiment of the present invention. Computer system 100 includes processor 102, memory 104, power supply 106 and heater 108.

Processor 102 can generally include any type of processor, including, but not limited to, a microprocessor, a mainframe computer, a digital signal processor, a personal organizer, a device controller, a computational engine within an appliance, and any other processor now known or later developed. Furthermore, processor 102 can include one or more cores.

Note that although FIG. 1 illustrates computer system 100 with one processor, computer system 100 can include more than one processor. In a multi-processor configuration, the processors can be located on a single system board, or multiple system boards. Computer system 100 can include but is not limited to a server, server blade, a datacenter server, or an enterprise computer.

Memory 104 can include any type of memory, including but not limited to, dynamic random access memory (DRAM), static random access memory (SRAM), flash memory, read only memory (ROM), and any other type of memory now known or later developed.

Power supply 106 is a power supply for computer system 100. Power supply 106 can include any type of power supply, including but not limited to alternating current (AC) to direct current (DC), or DC to DC implemented in any type of technology now know or later developed.

Heater 108 is a heater thermally coupled to power supply 106. Heater 106 can include any type device that generates heat including a resistive heater or a heater implemented using any other technology now known or later developed. Heater 108 can be chosen based on factors including but not limited to its cost, power consumption, response time, controllability, or matching the thermal output of the heater to the thermal conduction of the power supply to its surroundings.

Monitoring mechanism 110 is coupled to processor 102, memory 104, power supply 106, and heater 108. Monitoring mechanism 110 receives input about the state of computer system 100 by receiving input from processor 102, memory 104 and power supply 106. Based on the state of computer system 100, monitoring mechanism 110 controls the temperature of power supply 106 by controlling heater 108.

In some embodiments monitoring mechanism 110 includes a method or apparatus for monitoring and recording computer system performance parameters as set forth in U.S. Pat. No. 7,020,802 which is hereby fully incorporated by reference.

Monitoring mechanism 110 can be implemented in any combination of hardware and software. In some embodiments monitoring mechanism 110 is implemented in the same processor and memory of the computer system whose power supply is being controlled. In other embodiments, monitoring mechanism 110 operates on a separate computer system that continues operating when computer system 100 is powered off.

In other embodiments, cooling fans are included in computer system 100 to cool processor 102 and power supply 106 when they are powered on. In some of these embodiments the cooling fans are turned off when computer system 100 is turned off and in other embodiments the fans are not turned off. In still other embodiments the fans are controlled by monitoring mechanism 110 and are used in addition to heater 108 to control the temperature of power supply 106.

Figure 2:
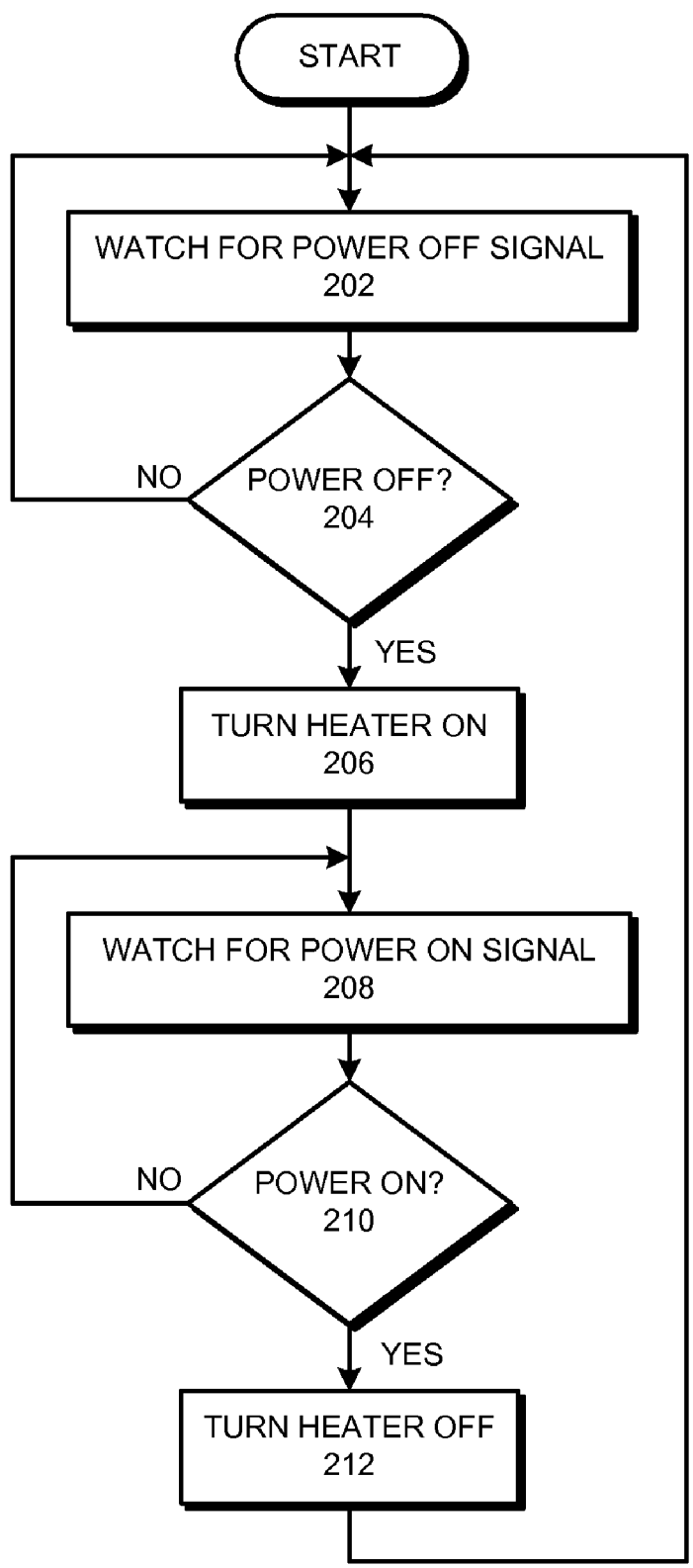
FIG. 2 presents a flow chart illustrating a process of controlling the temperature of a power supply in a computer system in accordance with an embodiment of the present invention.

FIG. 2 presents a flow chart illustrating a process of controlling the temperature of a power supply in a computer system in accordance with an embodiment of the present invention. The monitoring mechanism watches for a power off signal in the computer system (step 202). If a power off signal is not received (step 204) then the monitoring mechanism continues to check for a power off signal (step 202). If a power off signal is received (step 204) then the monitoring mechanism generates a signal to turn the heater on (step 206).

The monitoring mechanism then watches for a power on signal (step 208). If a power on signal is not detected (step 210) then the monitoring mechanism continues to check for a power on signal (step 208). If a power on signal is detected (step 210) then the monitoring mechanism generates a signal to turn the heater off (step 212). The monitoring mechanism then returns to step 202.

In other embodiments of the present invention the monitoring mechanism watches for a signal representing a predetermined change in state of the computer system. When the signal is received the monitoring mechanism generates a signal that controls the heater to control the temperature of the power supply to a predetermined temperature or in other embodiments controls the temperature to be within a predetermined temperature range.

In some embodiments of the present invention, the computer system includes a server and the monitoring mechanism includes the system for systematically monitoring and recording performance parameters for a computer system as described in U.S. Pat. No. 7,020,802. The monitoring mechanism involves systematically monitoring and recording a set performance parameters of the computer system, wherein the recording process keeps track of the temporal relationships between events in different performance parameters.

In other embodiments of the present invention when any parameter varies that can cause a change in the temperature of the power supply, including but not limited to the load on the computer system, or the environment external to the computer system such as air conditioning turning on or off, the monitoring mechanism detects the variation of the parameter and generates a signal representing the variation of the state of the computer system. This signal is then used to control the heater to control the temperature of the power supply to be within a predetermined temperature range.

In some embodiments of the present invention the predetermined temperature range is determined by any thermally related parameters of the power supply including but not limited to mean time between failure (MTBF) of the power supply, reliability, availability, serviceability (RAS) of the power supply, the coefficient of thermal expansion (CTE) of materials in the power supply and differences in CTEs of materials in the power supply, solder fatigue, interconnect fretting, wire-bond shear, flexure fatigue, micro-crack initiation and propagation, repeated stress reversals in material in the power supply or any other temperature related effects that can lead to dislocations, cracks, or eventual mechanical failures in one or more parts of the power supply, the thermal environment of the power supply including but not limited to its location in the computer system, the thermal output of components in the computer system, the operating temperature of the computer system, the thermal effects of load variations in the computer system, and any other factor that may affect the thermal environment of the power supply.

Figure 3:
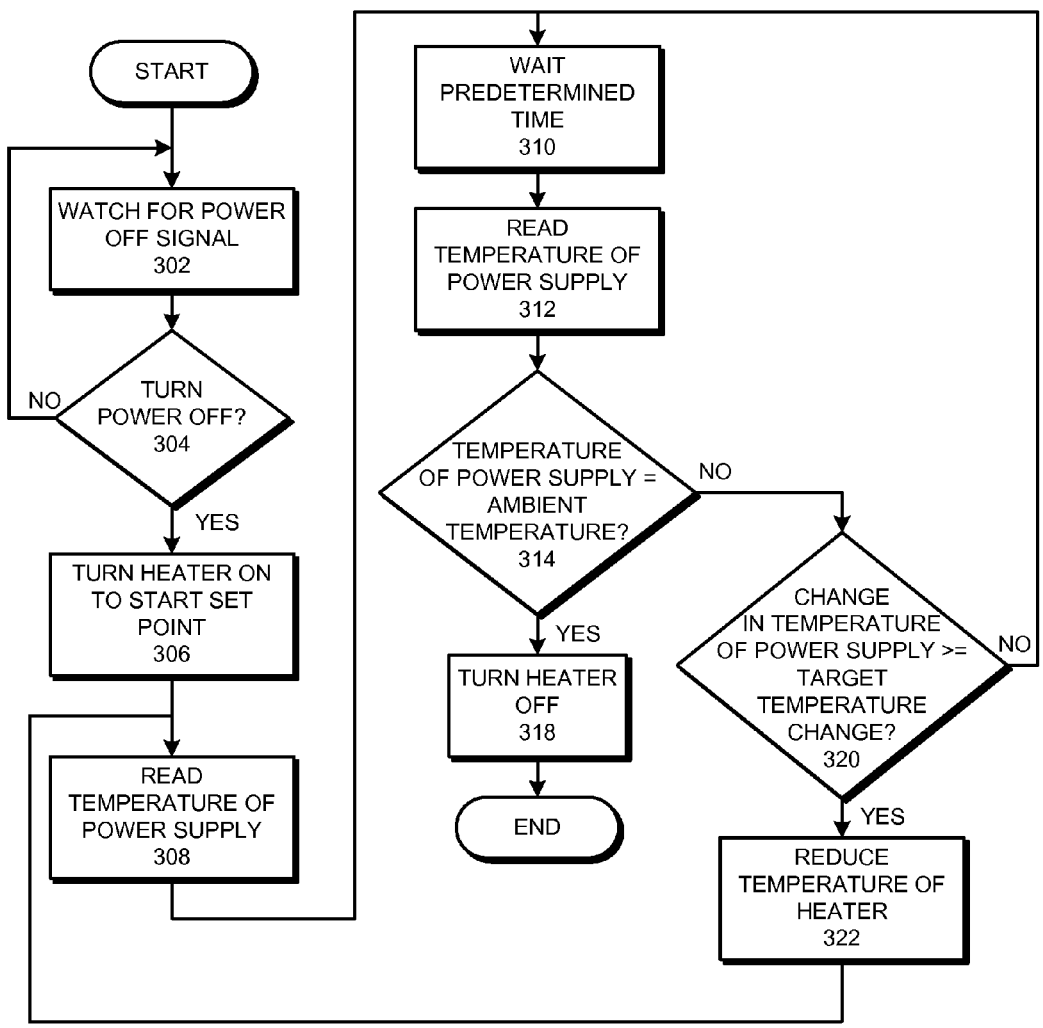
FIG. 3 presents a flow chart illustrating a process of controlling the temperature of a power supply in a computer system in accordance with an embodiment of the present invention.

FIG. 3 presents a flow chart illustrating a process of controlling the temperature of a power supply in a computer system in accordance with an embodiment of the present invention. This embodiment ramps down the temperature of the power supply at a controlled rate until the power supply reaches the ambient air temperature when the power to the computer system is turned off. During this process, the monitoring mechanism watches for a power off signal in the computer system (step 302). If a power off signal is not detected (step 304) then the monitoring mechanism continues to watch for a power off signal (step 302). If a power off signal is received (step 304) then the monitoring mechanism generates a signal to turn the heater on and set it to a predetermined start set point (step 306). The monitoring mechanism then receives a signal representing the temperature of the power supply (step 308). The monitoring mechanism then waits a predetermined time (step 310) and then receives another signal representing the temperature of the power supply (step 312). If the temperature of the power supply is equal to the ambient temperature (step 314), then the monitoring mechanism sends a signal to turn the heater off (step 318). In some embodiments of the present invention, after step 318 the monitoring mechanism then continues on to a next step that watches for a power on signal in the computer system. In some embodiments of the present invention the step of watching for a power on signal in the computer system includes step 402 of FIG. 4 discussed below.

If the temperature of the power supply is not equal to the ambient temperature (step 314) then the monitoring mechanism determines if the change in the temperature of the power supply is greater than or equal to a predetermined target temperature change (step 320). If the change is greater than or equal to the predetermined target temperature change (step 320) then the monitoring mechanism generates a signal to control the heater to reduce the temperature of the power supply by the predetermined target temperature change (step 322). The monitoring mechanism then continues on to step 308. If the change is not greater than or equal to the predetermined target temperature change (step 320) then the monitoring mechanism returns to step 310.

It is noted that the predetermined target temperature change checked for in step 320, the predetermined target temperature change used by the monitoring mechanism in step 322, and the predetermined time used in step 310 can be altered during each loop through those steps in order to achieve any desired temperature profile in the power supply versus time. Parameters that may be used to determine any of these values or any other values in the process include but are not limited any of the thermally related parameters of the power supply discussed above.

In some embodiments of the present invention the monitoring mechanism at step 314 checks if the temperature of the power supply is at a predetermined final temperature other than the ambient temperature. If it is, then in step 318 the monitoring mechanism sends a signal to put the heater in a predetermined state to control the temperature of the power supply at a predetermined temperature or in a predetermined temperature range.

Figure 4:
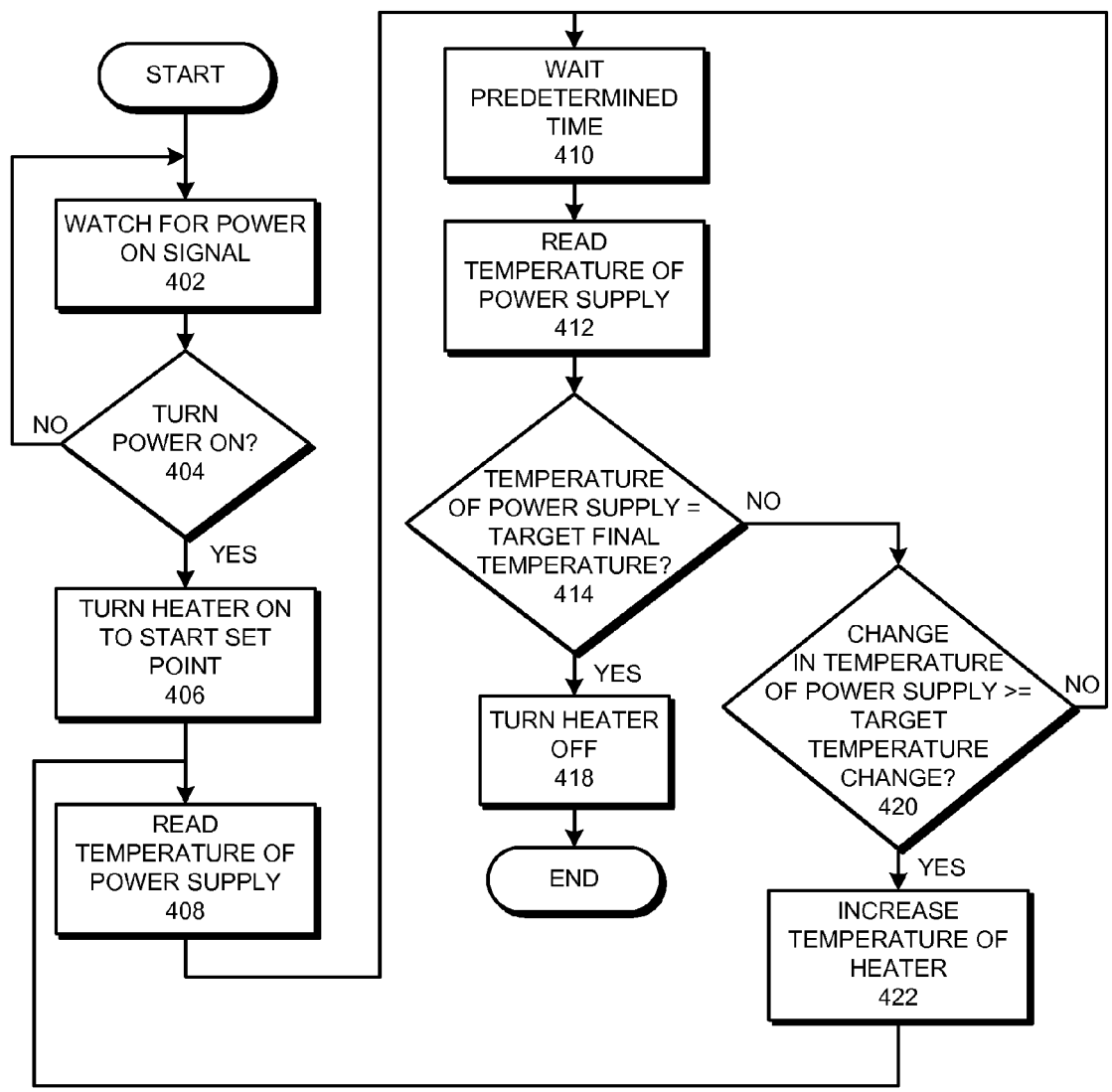
FIG. 4 presents a flow chart illustrating a process of controlling the temperature of a power supply in a computer system in accordance with an embodiment of the present invention.

FIG. 4 presents a flow chart illustrating a process of controlling the temperature of a power supply in a computer system in accordance with an embodiment of the present invention. This embodiment ramps up the temperature of the power supply at a controlled rate until the temperature of the power supply reaches a target operating temperature when the power to the computer system is turned on. During this process, the monitoring mechanism watches for a power on signal in the computer system (step 402). If a power on signal is not detected (step 404) then the monitoring mechanism continues to watch for a power on signal (step 402). If a power on signal is received (step 404) then the monitoring mechanism generates a signal to turn the heater on and set it to a predetermined start set point (step 406). The monitoring mechanism then receives a signal representing the temperature of the power supply (step 408). The monitoring mechanism then waits a predetermined time (step 410) and then receives another signal representing the temperature of the power supply (step 412). If the temperature of the power supply is equal to a predetermined target final temperature (step 414) then the monitoring mechanism sends a signal to turn the heater off (step 418). In some embodiments of the present invention, after step 418 the monitoring mechanism then continues on to a next step that watches for a power off signal in the computer system. In some embodiments of the present invention the step of watching for a power off signal in the computer system includes step 302 of FIG. 3.

If the temperature of the power supply is not equal to the predetermined target final temperature (step 414) then the monitoring mechanism determines if the change in the temperature of the power supply is greater than or equal to a predetermined target temperature change (step 420). If the change is greater than or equal to the predetermined target temperature change (step 420) then the monitoring mechanism generates a signal to control the heater to increase the temperature of the power supply by the predetermined target temperature change (step 422). The monitoring mechanism then continues on to step 408. If the change is not greater than or equal to the predetermined target temperature change (step 420) then the monitoring mechanism returns to step 410.

It is noted that the predetermined target temperature change checked for in step 420, the predetermined target temperature change used by the monitoring mechanism in step 422, and the predetermined time used in step 410 can be changed during each loop through those steps in order to achieve any desired temperature profile in the power supply versus time. Parameters that may be used to determine any of these values or any other values in the process include but are not limited any of the thermally related parameters of the power supply discussed above.

The foregoing descriptions of embodiments have been presented for purposes of illustration and description only. They are not intended to be exhaustive or to limit the present description to the forms disclosed. Accordingly, many modifications and variations will be apparent to practitioners skilled in the art. Additionally, the above disclosure is not intended to limit the present description. The scope of the present description is defined by the appended claims

What is claimed is:

1. A method for controlling a temperature of a power supply in a computer system, comprising:
   monitoring a state of the computer system;
   generating a signal in response to the state of the computer system; and
   controlling the temperature of the power supply by using the signal to control a heater for the power supply, wherein the heater is directly thermally coupled to the power supply to provide heat to the power supply.

2. The method of claim 1, wherein using the signal to control the heater involves using the signal to control the temperature within a temperature range.

3. The method of claim 1, wherein using the signal to control the heater involves using the signal to control the temperature within a temperature range when the signal indicates a change in a load on the computer system.

4. The method of claim 1, wherein using the signal to control the heater involves controlling a rate of change of the temperature.

5. The method of claim 1, wherein,
   using the signal to control the temperature of the power supply involves turning on the heater when the signal indicates the power supply is turned off; and
   turning off the heater when the signal indicates the power supply is turned on.

6. The method of claim 1, wherein using the signal to control the temperature of the power supply involves using the heater to ramp down the temperature at a controlled rate when the signal indicates the power supply is to be turned off.

7. The method of claim 6, wherein using the signal to control the temperature of the power supply involves using the heater to ramp up the temperature of the power supply at a controlled rate when the signal indicates the power supply is to be turned on.

8. The method of claim 1, wherein monitoring the computer system involves systematically monitoring and recording a set performance parameters of the computer system, wherein the recording process keeps track of the temporal relationships between events in different performance parameters.

9. The method of claim 1, further comprising using the signal to control a cooling mechanism for the power supply.

10. The method of claim 1, wherein monitoring the state of the computer system involves monitoring the temperature of the computer system.

11. A computer-readable storage medium storing instructions that when executed by a computer cause the computer to perform a method for controlling a temperature of a power supply in a computer system, comprising:
monitoring a state of the computer system;
generating a signal in response to the state of the computer system; and
controlling the temperature of the power supply by using the signal to control a heater for the power supply, wherein the heater is directly thermally coupled to the power supply to provide heat to the power supply.

12. The computer-readable storage medium of claim 11, wherein using the signal to control the heater involves using the signal to control the temperature within a temperature range.

13. The computer-readable storage medium of claim 11, wherein using the signal to control the heater involves using the signal to control the temperature within a temperature range when the signal indicates a change in a load on the computer system.

14. The computer-readable storage medium of claim 11, wherein using the signal to control the heater involves controlling a rate of change of the temperature.

15. The computer-readable storage medium of claim 11, wherein,
using the signal to control the temperature of the power supply involves turning on the heater when the signal indicates the power supply is turned off; and
turning off the heater when the signal indicates the power supply is turned on.

16. The computer-readable storage medium of claim 11, wherein using the signal to control the temperature of the power supply involves using the heater to ramp down the temperature at a controlled rate when the signal indicates the power supply is to be turned off.

17. The computer-readable storage medium of claim 16, wherein using the signal to control the temperature of the power supply involves using the heater to ramp up the temperature of the power supply at a controlled rate when the signal indicates the power supply is to be turned on.

18. The computer-readable storage medium of claim 11, wherein monitoring the computer system involves systematically monitoring and recording a set performance parameters of the computer system, wherein the recording process keeps track of the temporal relationships between events in different performance parameters.

19. The computer-readable storage medium of claim 11, wherein using the signal to control the temperature involves using the signal to control a cooling mechanism for the power supply.

20. The computer-readable storage medium of claim 11, wherein monitoring the state of the computer system involves monitoring the temperature of the computer system.

21. An apparatus that controls a temperature of a power supply in a computer system, comprising:
a monitoring mechanism configured to monitor a state of the computer system;
a generating mechanism configured to generate a signal in response to the state of the computer system;
a mechanism configured to use the signal to control a heater for the power supply, wherein controlling the heater controls the temperature of the power supply, wherein the heater is directly thermally coupled to the power supply to provide heat to the power supply.

22. The apparatus of claim 21, wherein the monitoring mechanism is configured to systematically monitor and record a set performance parameters of the computer system, wherein the recording process keeps track of the temporal relationships between events in different performance parameters.

* * * * *